United States Patent
Ando et al.

(10) Patent No.: US 6,890,966 B2
(45) Date of Patent: May 10, 2005

(54) PROCESS FOR THE PRODUCTION OF A LIGHTWEIGHT COLD URETHANE

(75) Inventors: Masahiko Ando, Hamamatsu (JP); Eiji Matsumoto, Hamamatsu (JP)

(73) Assignee: Suzuki Motor Corporation, Shizouka-Ken (JP)

( * ) Notice: Subject to any disclaimer, the term of this patent is extended or adjusted under 35 U.S.C. 154(b) by 114 days.

(21) Appl. No.: 10/143,691

(22) Filed: May 10, 2002

(65) Prior Publication Data

US 2002/0198354 A1 Dec. 26, 2002

(30) Foreign Application Priority Data

May 11, 2001 (JP) ........................................ 2001-141792

(51) Int. Cl.$^7$ ............................................... C08G 18/28
(52) U.S. Cl. ........................ 521/128; 521/110; 521/112; 521/117; 521/164; 521/167; 521/170; 521/174; 528/85
(58) Field of Search ................................ 521/110, 112, 521/117, 164, 167, 170, 174, 128; 528/85

(56) References Cited

U.S. PATENT DOCUMENTS 5,618,854 A * 4/1997 Skorpenske et al. ........ 521/164
5,789,451 A * 8/1998 Guidetti et al. ............... 521/51
6,433,033 B1 * 8/2002 Isobe et al. .................. 521/170

FOREIGN PATENT DOCUMENTS

| JP | 5-202164 | 8/1993 |
|---|---|---|
| JP | 5-320304 | 8/1993 |
| JP | 5-320304 | 12/1993 |
| JP | 06-166042 | 6/1994 |
| JP | 10-176025 | 6/1998 |

* cited by examiner

Primary Examiner—John M. Cooney, Jr.
(74) Attorney, Agent, or Firm—Myers Bigel Sibley & Sajovec, PA (57) ABSTRACT

In a process for the production of a lightweight cold urethane wherein raw materials are injected into a mold in one shot, diethanolamine is added in an amount of 0.1 to 2.0 parts by weight per 100 parts by weight of the polyol. When principal raw materials including a polyol and an isocyanate, and an auxiliary ingredient mixture prepared by previously mixing auxiliary ingredients other than the polyol and the isocyanate, are injected into a mold from separate storage vessels, a water-soluble silicone foam stabilizer is added to the auxiliary ingredient mixture.

5 Claims, 6 Drawing Sheets

PROCESS FOR THE PRODUCTION OF A LIGHTWEIGHT COLD URETHANE

RELATED APPLICATION

This application claims priority under 35 U.S.C. §371 from Japanese Application No. 2001-141792 filed May 11, 2001 the disclosure of which is incorporated by reference herein in its entirety.

FIELD OF THE INVENTION

This invention relates to a process for the production of a lightweight cold urethane which is a raw material for cushioning materials used in the seats of automobiles, motorcycles and the like.

BACKGROUND OF THE INVENTION

Figure 8:
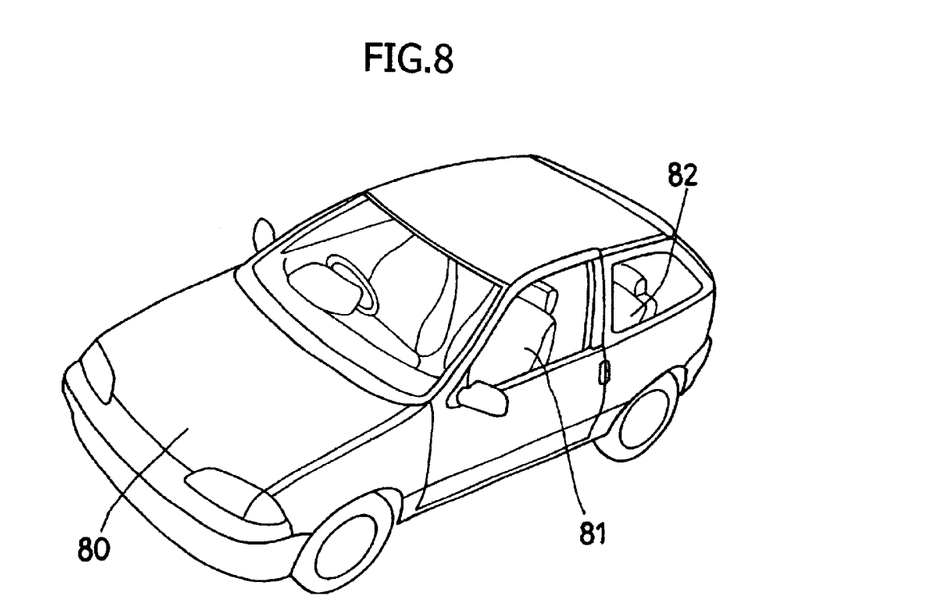
FIG. 8 is a perspective view illustrating one embodiment of an automobile to which the urethane products made according to the present invention can be applied.
Figure 9:
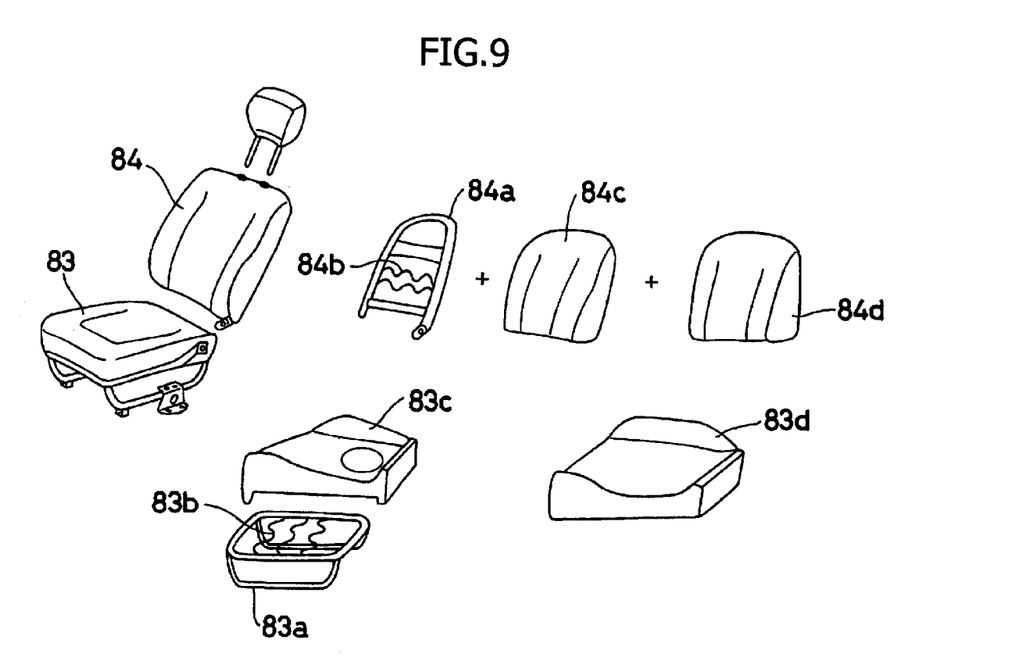
FIG. 9 is a perspective view for explaining the construction of an automobile seat.

Conventionally, urethane foam is used, for example, in the seats 81 and 82 of an automobile 80 illustrated in FIG. 8. Automobile seats 81 and 82 are classified into front seats 81 and rear seats 82. As illustrated in FIG. 9, each of seats 81 and 82 consists of a cushioned part 83 which supports one's buttocks directly, and a backrest 84 against which one's back is leaned. Roughly speaking, each seat is made up of four components as illustrated in FIG. 9. They include a frame 83a or 84a providing the framework of the seat, springs 83b or 84b for maintaining cushioning properties, urethane 83c or 84c serving to absorb vibrations, and a skin 83d or 84d protecting the urethane and coming into direct contact with one's body. Among such urethanes 83c and 84c, especially the urethane 84c constituting the backrests is required to have softness and holding properties.

A lightweight cold urethane is especially suitable for use as the urethane constituting the backrests (i.e., back urethane).

However, conventional lightweight cold urethanes had the following problems.

(1) Conventional lightweight cold urethanes have a density of about 40 kg/m$^3$ and are heavier than hot urethanes (27–35 kg/m$^3$). They require a larger number of raw materials to be injected into a mold, and hence involve a high cost. Moreover, they cause a corresponding increase in car body weight and hence bring about poor fuel consumption.

(2) In conventional formulations, the density can be reduced to some extent (34 kg/m$^3$) by increasing the amount of water (i.e., the number of parts of water). However, this causes a problem in that the resulting urethane no longer has flame retardancy. Although the addition of a flame retardant is conceivable, this causes an increase in cost and is hence impractical. Moreover, the resulting urethane gives an easily yielding pad and fails to meet performance requirements for seats.

As a lightweight cold urethane solving these problems and meeting property requirements such as excellent flame retardancy, the present inventors developed a lightweight cold urethane as disclosed in Japanese Patent Provisional Publication No. 10-176025. However, this lightweight cold urethane still has an unsolved problem in that the type of polyol used is limited.

Accordingly, there is a need for the preparation of a lightweight cold urethane having a flame-retardant formulation using common polyols. Additional urethane formulations are described in Japanese Patent Provisional Publication Nos. 5-320304, 6-166042 and 5-202164. However, none of them can bring about an improvement in flame retardancy.

On the other hand, it has been conventional practice to feed two urethane-forming raw material fluids from raw material fluid sources into an injection head through separate hoses, and inject them from the injection head into a lower mold section. Both fluids are mixed by collision in the injection head and then injected into the mold. Moreover, such a two-component foaming mold has been developed so as to use a four-component injection head. This permits various types of urethane foam having different densities and hardnesses to be formed with a single injection head.

When such an injection head is used, it is preferable that, among various compounding ingredients, auxiliary ingredients be mixed and placed in one working tank. However, in conventional formulations, this auxiliary ingredient mixture consists chiefly of water. This has been problematic in that the piping is apt to rust and a homogeneous fluid cannot be formed because of the poor miscibility of water and an oily silicone foam stabilizer or the like. For this reason, even the use of a four-component injection head has been unable to produce satisfactory results.

SUMMARY OF THE INVENTION

Accordingly, an object of the present invention is to provide a process for the production of a lightweight cold urethane having a flame-retardant formulation using common polyols. Another object of the present invention is to provide such a process for the production of a lightweight cold urethane by using a formulation with which, even when a four-component head is used, the piping can be prevented from rusting and the uniform dispersion of auxiliary ingredients can be achieved.

In accordance with the present invention, there is provided a process for the production of a lightweight cold urethane, which comprises the steps of adding diethanolamine to the formulation in an amount of 0.1 to 2.0 parts by weight per 100 parts by weight of a polyol and injecting raw materials into a mold in one shot.

In the process for the production of a lightweight cold urethane in accordance with the present invention, it is preferable that principal raw materials including a polyol and an isocyanate, and an auxiliary ingredient mixture prepared by previously mixing ingredients other than the polyol and the isocyanate, be each injected from separate storage vessels into a mold, and that a water-soluble silicone foam stabilizer be added to the auxiliary ingredient mixture.

In the process for the production of a lightweight cold urethane in accordance with the present invention, it is preferable that the raw materials include 100 parts by weight of a polyol, an isocyanate used in an amount in the range of 70 to 150% of its stoichiometric amount for the polyol, and an auxiliary ingredient mixture comprising 2.5 to 5.5 parts by weight of water, 0.1 to 2.0 parts by weight of diethanolamine, 0.5 to 3 parts by weight of a catalyst, 0.4 to 2.0 parts by weight of a water-soluble silicone foam stabilizer, 0 to 2.0 parts by weight of a silicone foam stabilizer, and other additives. Moreover, the auxiliary ingredient mixture may further comprise a rust preventive, preferably in an amount of not greater than 0.1 part by weight.

Furthermore, in the process for the production of a lightweight cold urethane in accordance with the present invention, the aforesaid auxiliary ingredient mixture may further comprise a polyol. In this case, it is preferable to add a polyol to the aforesaid auxiliary ingredient mixture in an amount of 0 to 50 parts by weight per 100 parts by weight of the polyol fed to the mixing head as a principal raw material by way of another system.

When parts and percentages are used herein to express amounts and proportions, they are by weight unless otherwise specified.

As will become evident from the following description, the present invention provides a process for the production of a lightweight cold urethane having a flame-retardant formulation using common polyols. Moreover, the present invention also provides a process for the production of a lightweight cold urethane by using a formulation with which, even when a four-component head is used, the piping can be prevented from rusting and the uniformed dispersion of auxiliary ingredients can be achieved.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar element.

DETAILED DESCRIPTION OF THE PREFERRED EMBODIMENTS

In the process for the production of a lightweight cold urethane in accordance with the present invention, diethanolamine is added to the formulation in an amount of 0.1 to 2.0 parts by weight per 100 parts by weight of the polyol. For example, raw materials are compounded according to the formulation shown in Table 1.

TABLE 1

| | Raw materials | Compounding ratio (by weight) |
|---|---|---|
| Fluid A | Polyol (PPG + POP) | 100 |
| | Crosslinking agent (diethanolamine) | 0.1–2.0 |
| | Catalyst (e.g., TEDA-L33) | 0.5 |
| | Catalyst (e.g., TOYOCAT-ET) | 0.1 |
| | Silicone foam stabilizer A | 0–3 |
| | Silicone foam stabilizer B | 0–3 |
| | Foam breaker | 0–10 |
| | Other auxiliary ingredients | 0–10 |
| | Foaming agent (H$_2$O) | 2–6 |
| Fluid B | Isocyanate | 90–110% of the stoichiometric amount |

In this formulation, the polyol preferably comprises a combination of PPG such as HIFLEX 515 (trade name; manufactured by Dai-ichi Kogyo Seiyaku Co., Ltd.) and POP such as HIFLEX ND853 (trade name; manufactured by Dai-ichi Kogyo Seiyaku Co., Ltd.). These PPG and POP are stored in separate working tanks (storage vessels) and fed to the injection head through separate pipe lines. PPG is prepared by the addition polymerization of propylene and ethylene to glycerol or the like. The polyol prepared by the graft polymerization of polystyrene or the like to PPG is called POP or a graft polyol.

The ingredients of fluid A other than the polyol are mixed to prepare an auxiliary ingredient mixture. This auxiliary ingredient mixture is stored in a separate working tank and fed to the injection head. This auxiliary ingredient mixture may contain a polyol.

Useful catalysts include amine catalysts such as triethylenediamine, bis(2-dimethylaminoethyl) ether, 1,4-diazobicyclo[2.2.2]octane, N,N,N',N'-tetramethylhexamethylenediamine and N,N,N-tris(dimethylaminopropyl)amine. Moreover, there may also be used other types of catalysts (e.g., organotin compounds) or a combination of some catalysts, so long as the urethane product desired in the present invention can be obtained.

In the present invention, a silicone foam stabilizer may also be used as an additive.

This additive is used to facilitate the mixing and emulsification of the polyol, water and the isocyanate and stabilize the foam being formed.

Specifically, it is preferable to use a compound of the following formula (I) in which polyether groups are joined to a dimethylsiloxane chain as pendant groups.

I

In formula (I), a, b, m and n are independent integers of 0 or greater respectively. R' is a hydrocarbon chain interposed between Si and O (oxygen atom), and may be a saturated, unsaturated, branched or like hydrocarbon chain. R is an alkyl group and may be a saturated, unsaturated, branched or like alkyl group.

The foam breaker is added for the purpose of breaking the cell wall of the urethane foam to form interconnected cells and thereby enhancing the air permeability of the urethane foam. A specific example thereof is DK FLEX 800 (trade name; manufactured by Dai-ichi Kogyo Seiyaku Co., Ltd.).

As other auxiliary ingredients, a crosslinking agent and a flame retardant may be added.

Water is added as a foaming agent.

Preferred examples of the isocyanates which can be used in the present invention include aromatic polyisocyanates.

More preferably, a mixture composed of TDI (tolylene diisocyanate) represented by the following formula (II) and p-MDI (polymethylene polyphenyl polyisocyanate) represented by the following formula (III) is used.

The isocyanate is stored, as fluid B, in a working tank other than the aforesaid three working tanks.

When a mixture of TDI and p-MDI is used, the weight ratio of TDI to p-MDI (TDI/p-MDI) is preferably in the range of 80/20 to 100/0.

The amount of isocyanate used is in the range of 80 to 120% of its stoichiometric amount for the polyol.

A specific example of the formulation of Table 1 is shown in Table 2. Using this formulation, changes in flame retardancy were examined by adding 1 to 10 parts by weight of diethanolamine. The results thus obtained are shown in FIG. 1.

TABLE 2

|  | Raw materials | Manufacturer | Compounding ratio (by weight) |
|---|---|---|---|
| Fluid A | Polyol (PPG + POP) | Asahi Glass Co., Ltd. | 100 |
|  | Crosslinking agent (diethanolamine) | Mitsui Chemicals, Inc. | 0.5 |
|  | Catalyst (TEDA-L33) | Tosoh Corporation | 0.5 |
|  | Catalyst (TOYOCAT-ET) | Tosoh Corporation | 0.1 |
|  | Silicone foam stabilizer (SZ-1311) | Nippon Unicar Co., Ltd. | 1.0 |
|  | Silicone foam stabilizer (L-5366) | Nippon Unicar Co., Ltd. | 1.0 |
|  | Foam breaker (DK FLEX 800) | Dai-ichi Kogyo Seiyaku Co., Ltd. | 4.0 |
|  | Foaming agent (H₂O) |  | 4.5 |
| Fluid B | Isocyanate (TM-20) | Mitsui Chemicals, Inc. | 55.0 |

Figure 1:
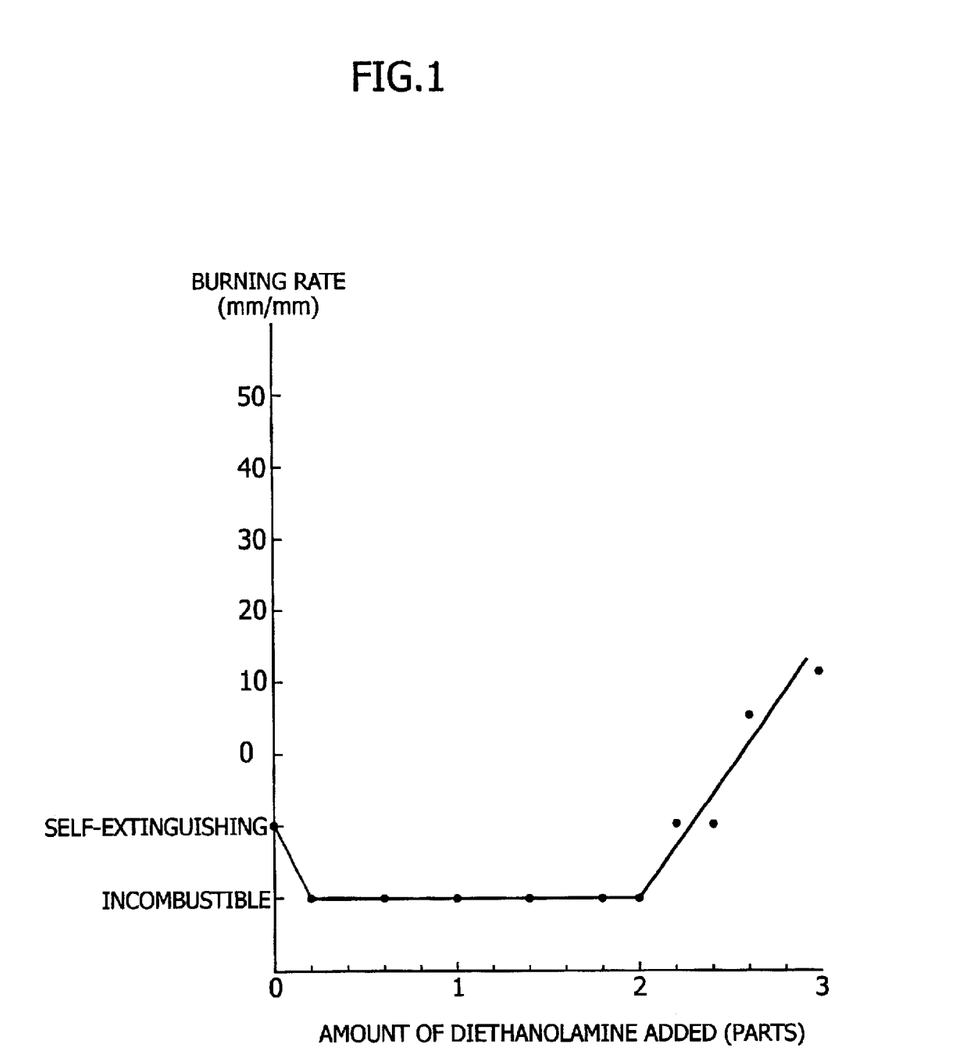
FIG. 1 is a graph showing the relationship between the amount of diethanolamine added and the flame retardancy, with regard to the process for the production of a lightweight cold urethane in accordance with the present invention.
Figure 2:
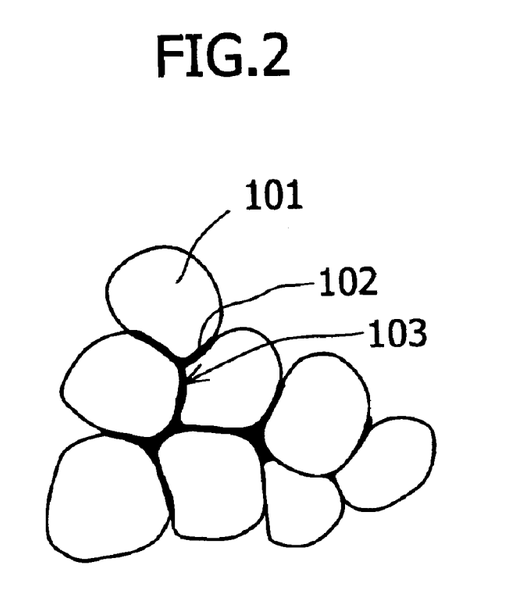
FIG. 2 is a schematic view showing the relationship between the foam formed and its crosslinked points and cell skeleton, with regard to the process for the production of a lightweight cold urethane in accordance with the present invention.

It can be seen from FIG. 1 that, when no diethanolamine is added, the urethane foam is not incombustible. When diethanolamine is added, the number of crosslinked points 102 between cells 101 increases as illustrated in FIG. 2. Owing to the increase of crosslinked points 102, the cellular skeleton 103 of the urethane foam comes to have a higher density. The increase in density causes a decrease in the degree of contact with air, resulting in a reduction in burning rate and hence an improvement in flame retardancy. Eventually, the urethane foam becomes incombustible when the amount of diethanolamine added reaches 0.1 part by weight. As diethanolamine is added in greater amounts, the increase in the density of the cell skeleton and the reduction in burning rate (hence the improvement in flame retardancy) proceed further.

Figure 3:
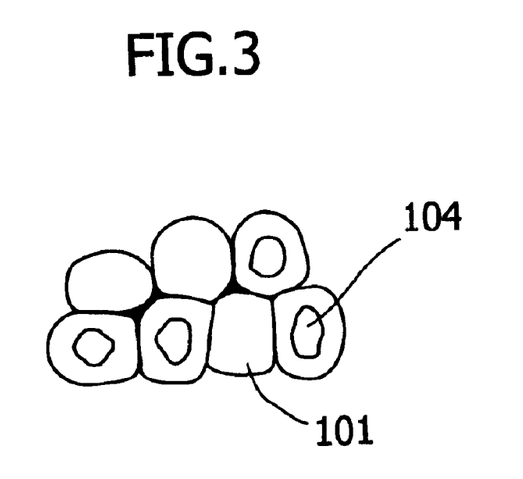
FIG. 3 is a schematic view for explaining a state in which the foam formed undergoes a rupture of cell membrane, with regard to a common process for the production of a lightweight cold urethane.

However, the addition of diethanolamine not only increases the density of the cell skeleton, but also enhances the air permeability of the foam. The reason for this is that the cell membrane becomes thinner and hence undergoes a rupture 104 (FIG. 3). The enhancement in air permeability decreases combustion-inhibiting factors and, moreover, increases contact with air, so that the urethane foam becomes combustible. When diethanolamine is added in greater amounts, such air permeability is manifested and, therefore, the once reduced combustibility begins to increase gradually.

That is, while the increase of the density of the cell skeleton dominates, the foam remains incombustible. However, when the amount of diethanolamine added is increased to such an extent that the air permeability factor dominates, the foam ceases to be incombustible. This situation can be understood by reference to FIG. 1.

As can be seen from the above description, the amount of diethanolamine added is preferably in the range of 0.1 to 2 parts by weight per 100 parts by weight of the polyol.

Moreover, in another embodiment of the present invention, a water-soluble silicone foam stabilizer is used in the formulation. An exemplary formulation is shown in Table 3.

TABLE 3

| Formulation | |
|---|---|
| Raw materials | Compounding ratio (by weight) |
| H₂O | 2.5–5.5 |
| Diethanolamine | 0.1–3.0 |
| Catalyst | 0.5–3.0 |
| Water-soluble silicone foam stabilizer | 0.4–2.0 |
| Silicone foam stabilizer | 0–2.0 |
| Rust preventive | 0–0.1 |
| Other additives | 0–10 |
| Polyol | 100 |
| Isocyanate | 70–150% of the stoichiometric amount |

According to this embodiment, even if only the auxiliary ingredients shown in Table 3 are used, no rust is formed because of an improvement in the dispersibility of the auxiliary ingredients.

Its difference from the formulation of Table 1 lies in the fact that a water-soluble silicone foam stabilizer is added and a rust preventive is added as required.

Similarly to the formulation of Table 1, the polyol may comprise PPG such as HIFLEX 515 (trade name; manufactured by Dai-ichi Kogyo Seiyaku Co., Ltd.) and POP such as HIFLEX ND853 (trade name; manufactured by Dai-ichi Kogyo Seiyaku Co., Ltd.). Alternatively, the polyol may comprise PPG such as XF-8387 (trade name; manufactured by Asahi Glass Co., Ltd.) and POP such as EL-946 (trade name; manufactured by Asahi Glass Co., Ltd.). PPG and POP are stored in separate working tanks and fed to the injection head through separate pipe lines.

The ingredients of fluid A, other than the polyol, are mixed to prepare an auxiliary ingredient mixture. This auxiliary ingredient mixture is stored in a separate working tank and is fed to the injection head.

Diethanolamine, the catalyst, the silicone foam stabilizer and the other additives may be the same as those described in the formulation of Table 1.

As the water-soluble silicone foam stabilizer, a mixture composed of a polyoxyalkylene-dimethylpolysiloxane copolymer of the following chemical formula and a polyoxyethylene alkyl ether, such as SZ-1333 (trade name; manufactured by Nippon Unicar Co., Ltd.), may be used.

As the rust preventive, a mixture of a phosphoric acid salt, hydrazine and an alkaline agent, such as Aquas Chelate MC-111 (trade name; manufactured by Aquas Corporation), may be used.

The isocyanate is stored, as fluid B, in a working tank other than the aforesaid three working tanks.

When a mixture of TDI and p-MDI is used, the weight ratio of TDI to p-MDI (TDI/p-MDI) is preferably in the range of 80/20 to 100/0.

The amount of isocyanate used is in the range of 70 to 150% of its stoichiometric amount for the polyol.

In the process for the production of a lightweight cold polyurethane in accordance with the present invention, molding is carried out by maintaining the mold temperature at a temperature of 20 to 80° C. In the case of a hot urethane, molding is carried out by heating the mold to a temperature of 120 to 160° C.

Now, one embodiment of the present invention in which a lightweight cold polyurethane is produced by using the aforesaid three fluids A and fluid B is described below.

Figure 4:
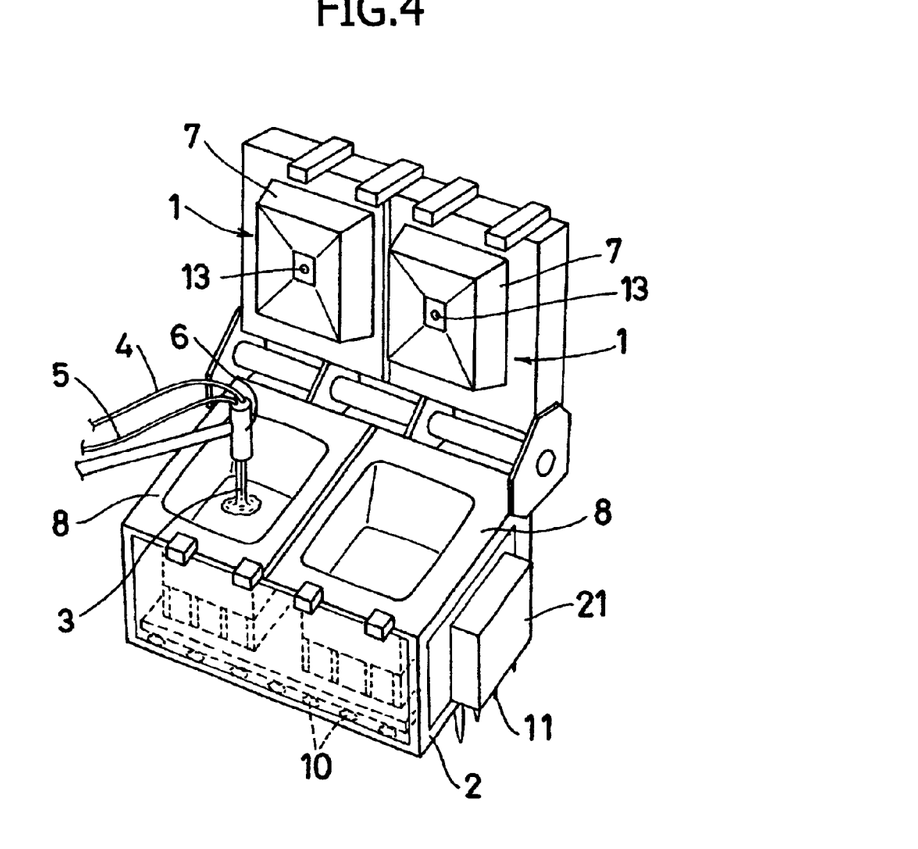
FIG. 4 is a perspective view illustrating one embodiment of a urethane foaming mold which can be used in the process for the production of a lightweight cold urethane in accordance with the present invention.

FIGS. 4 to 7 illustrate an embodiment of foam molding equipment for carrying out the process for the production of a lightweight cold polyurethane in accordance with the present invention. In FIG. 4, reference numeral 1 designates a urethane foaming mold having an air bag type mold clamping structure. This mold 1 is attached to a mold carrier 2 positioned on a circuit conveyor line (not shown), and used to produce urethane foam (product) for automobile seats and others by injecting thereinto a urethane-forming raw material fluid 3 comprising foaming raw materials and allowing it to be foamed and cured therein. For this purpose, a total of four fluids (i.e., three fluids A and one fluid B) are fed from raw material fluid sources (not shown) to an injection head 6 by way of hoses 4 and 5, and the resulting urethane-forming raw material fluid 3 is injected from injection head 6 into the lower mold section which will be described later. Thus, fluids A and B are mixed by collision in the injection head and then injected into mold 1. In this figure, only two hoses 4 and 5 are shown for purposes of simplification. Actually, one hose is provided for each of the four fluids.

As illustrated in FIG. 4, the aforesaid mold 1 is made up of an upper mold section 7 and a lower mold section 8 which are formed of casting aluminum (e.g., AC4C) and assembled in superposed relationship. These upper mold section 7 and lower mold section 8 are configured so that, when they are assembled into mold 1, vacant spaces (cavities) for forming the product are left therein.

A large number of air bags 10 which can be inflated by pneumatic pressure are disposed at the bottom of lower mold section 8. Mold 1 is constructed so that, when a dog 11 is kicked, these air bags 10 are inflated by filling them with air supplied from an air supply source (not shown). As a result, lower mold section 8 is raised to mate with upper mold section 7. Then, upper mold section 7 and lower mold section 8 are sealed and locked together by means of a mold-locking clamp cylinder.

On the other hand, a vent hole 13 extending through upper mold section 7 and communicating with the vacant space within mold 1 is provided at the center of upper mold section 7. Moreover, a vent valve (not shown) for opening and closing vent hole 13 is provided at the center of the outside of upper mold section 7. This valve can be moved in a vertical direction by means of an air cylinder (not shown) serving as an actuator. Depending on the vertical position of the valve in the vent hole, air within the vacant space is allowed to escape to the outside of mold 1 through the gap between their mating surfaces. Thus this valve is connected to the air cylinder.

Figure 5:
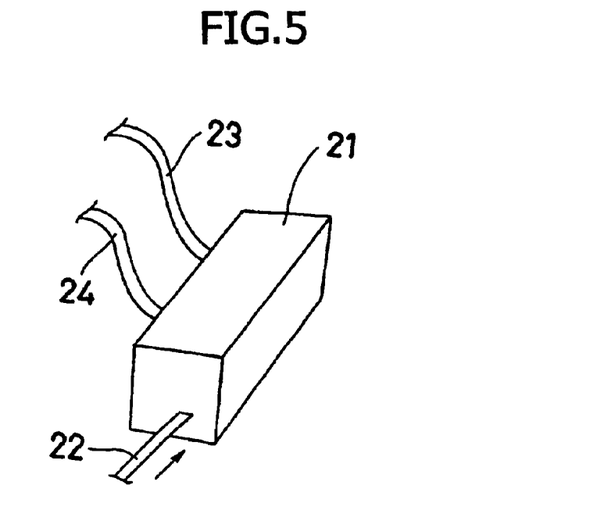
FIG. 5 is a perspective view illustrating an air sequence box for use with the urethane foaming mold of FIG. 4.

The aforesaid air cylinder is controlled by an air sequence circuit operating in response to the foaming rate of urethane-forming raw material fluid 3 (i.e., the rate at which the raw materials react to foam and expand) so as to time the operation of the valve properly. For this purpose, an air sequence box 21 having the air sequence circuit incorporated therein is attached, for example, to one side of mold carrier 2. As illustrated in FIG. 5, air sequence box 21 has a main air tube 22 and two sub air tubes 23 and 24, and these sub air tubes 23 and 24 connect air cylinder 15 and air sequence box 21 with each other. Consequently, air is supplied from an air supply source (not shown) to air sequence box 21 through main air tube 22, and then supplied to the air cylinder through any one of sub air tubes 23 and 24 so as to move the aforesaid valve (not shown) vertically.

Figure 6:
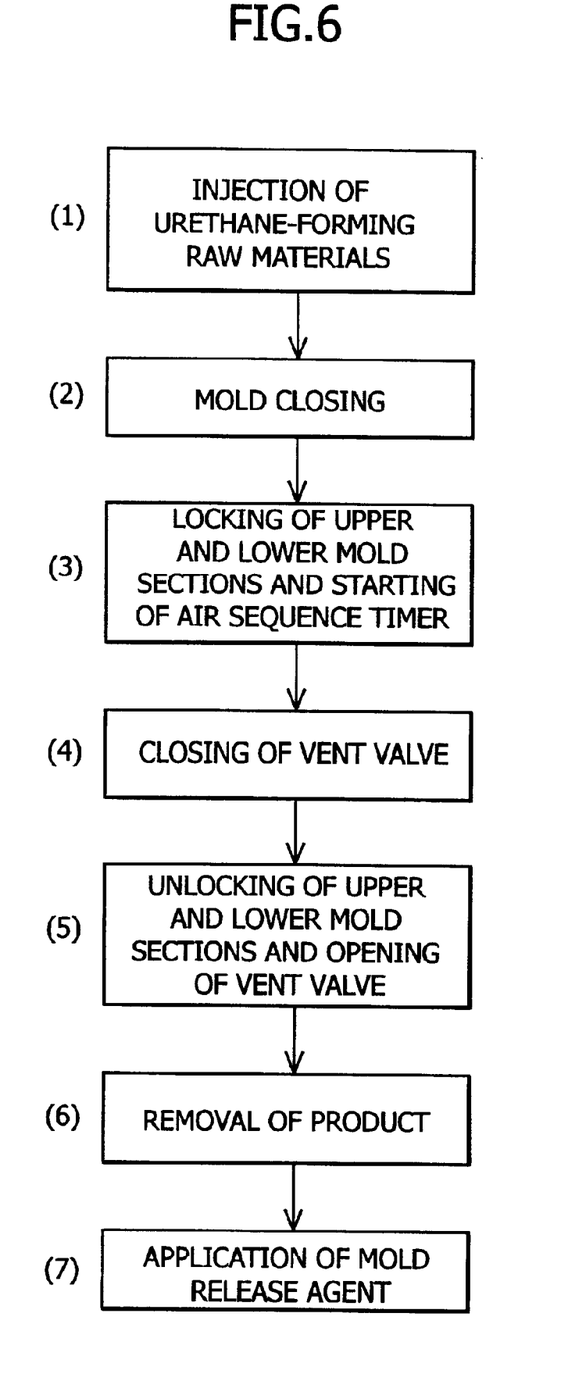
FIG. 6 is a flow chart showing a series of steps for producing urethane foam for automobile seats by using the urethane foaming mold of FIG. 4.

Now, the process for the production of urethane foam (product) for automobile seats by use of urethane foaming mold 1 in accordance with this embodiment is explained on the basis of process steps (1) to (7) shown in FIG. 6.

(1) Injection of Urethane-forming Raw Materials

First of all, a predetermined amount of urethane-forming raw material fluid 3 is injected from injection head 6 into lower mold section 8 of mold 1 in the state shown in FIG. 4.

(2) Mold Closing

After the injection of urethane-forming raw material fluid 3, mold 1 is closed by swinging upper mold section 7 toward lower mold section 8.

(3) Locking of Upper and Lower Mold Sections and Starting of Air Sequence Timer

By kicking dog 11 shown in FIG. 4, air bags 10 are filled with air to raise lower mold section 8. Thus, upper mold section 7 and lower mold section 8 are completely sealed and locked together by means of a clamp cylinder. Moreover, when dog 11 is kicked, the timer of air sequence box 21 is started.

(4) Closing of Vent Valve

Then, when the set point (defining the time at which urethane-forming raw material fluid 3 foams and rises to the top of upper mold section 7) of the timer of air sequence box 21 reaches a predetermined value (e.g., 3–20 seconds), a vent valve provided in upper mold section 7 is lowered and close vent hole 13. During this time, the following two reactions take place in urethane-forming raw material fluid 3 within mold 1, resulting in the formation of spongy urethane foam.

(i) Polymerization reaction (formation of urethane linkages)

Polyol+Isocyanate→Urethane polymer (ii) Foaming reaction

Water+Isocyanate→Carbon dioxide+Urea compound (5) Unlocking of Upper and Lower Mold Sections and Opening of Vent Valve By kicking dog 11, air is discharged from air bags 10 to drop lower mold section 8, and the clamp cylinder unlocks upper mold section 7 and lower mold section 8. Moreover, the air cylinder moves the vent valve upward and vent hole 13 is opened.

(6) Removal of Product

In this state, mold 1 is opened by swinging upper mold section 7 upward, and the product (urethane foam) is removed from mold 1.

(7) Application of Mold Release Agent

Thereafter, in preparation for the next production cycle, a mold release agent (comprising wax dissolved in a solvent) is sprayed over upper mold section 7 and lower mold section 8 of mold 1, and then dried to evaporate the solvent. Thus, the surfaces of mold 1 are coated with the mold release agent.

When urethane-forming raw material fluid 3 foams, an internal pressure is applied to the inside of mold 1. If the vent valve is not provided, upper mold section 7 may jump up when upper mold section 7 and lower mold section 8 are unlocked in step (5) shown in FIG. 6. After having jumped up, upper mold section 7 falls down under the action of gravity. Then, upper mold section 7 may strike against the urethane foam product and cause damage thereto (this phenomenon is called "double stamping"). Accordingly, the vent valve in accordance with this embodiment is also effective in preventing such double stamping. That is, since the vent valve is opened in step (5) of FIG. 6, the internal pressure is released.

Figure 7:
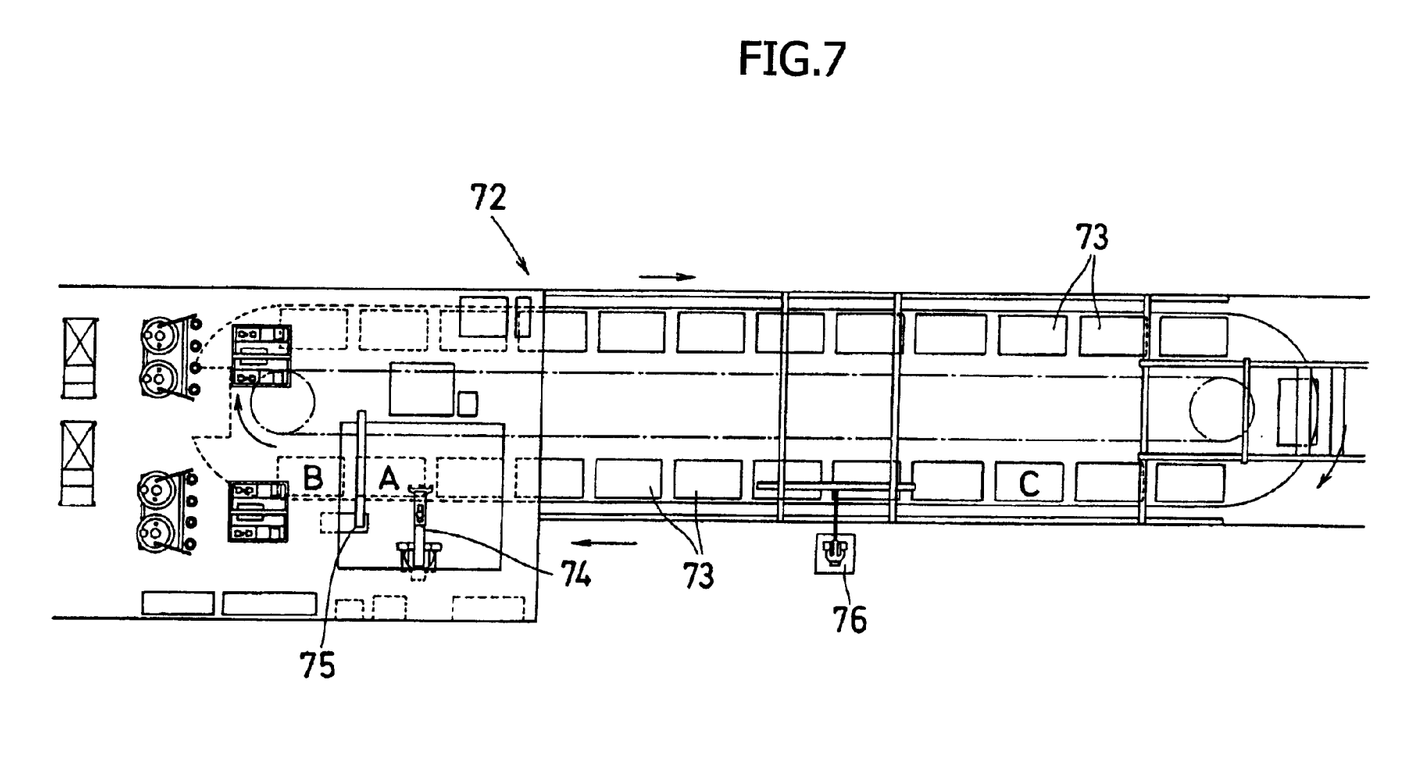
FIG. 7 is a plane view illustrating a seat manufacturing equipment equipped with mold carriers each having the molds of FIG. 4 attached thereto.

FIG. 7 illustrates one embodiment of equipment for the production of lightweight backrests 84 for automobiles. On a circuit conveyor line 72, a plurality of mold carriers 73 are disposed with fixed spacings. Each of these mold carriers 73 has the aforesaid urethane foaming molds attached thereto.

In order to produce urethane foam (for example, for use in automobile seats) by using these urethane foaming molds, an injection robot 74 injects the urethane-forming raw material fluid into the lower mold section of the open mold located at position A of FIG. 7. Then, a mold closing device 75 closes the upper mold section of the mold at position B. On circuit conveyor line 72, the mold carrier 73 travels in a clockwise direction as shown by an arrow in FIG. 7, and the urethane-forming raw materials within the mold are allowed to foam and cure during traveling. At position C, the upper mold section of the mold is opened and the product (e.g., a cured seat cushion) is removed therefrom. In FIG. 7, reference numeral 76 designates a coating robot for applying a mold release agent to the inner surfaces of the urethane foaming molds.

EXAMPLE

Using the raw materials shown in Table 4 below, backrests of lightweight cold urethane were produced by means of a four-component injection head.

TABLE 4

| | Raw materials | Manufacturer | Compounding ratio (by weight) |
|---|---|---|---|
| Fluid A | Polyol (PPG + POP) | Asahi Glass Co., Ltd. | 100 |
| | Crosslinking agent (diethanolamine) | Mitsui Chemicals, Inc. | 1.0 |
| | Catalyst (TEDA-L33) | Tosoh Corporation | 0.5 |
| | Catalyst (TOYOCAT-ET) | Tosoh Corporation | 0.08 |
| | Silicone foam stabilizer (SZ-1333) | Nippon Unicar Co., Ltd. | 0.6 |
| | Silicone foam stabilizer (L-5309) | Nippon Unicar Co., Ltd. | 0.9 |
| | Foam breaker (DK FLEX 800) | Dai-ichi Kogyo Seiyaku Co., Ltd. | 5.5 |
| | Foaming agent ($H_2O$) | | 3.7 |
| Fluid B | Isocyanate (TM-20) | Mitsui Chemicals, Inc. | 45.0 |

The ingredients except for polyol of fluid A corresponds to a composition of auxiliary ingredients.

As the polyol, a combination of XF-8387 (trade name) and EL-946 (trade name), both manufactured by Asahi Glass Co., Ltd., was used.

As the amine catalyst, a solution containing 33% of triethylenediamine in 67% of dipropylene glycol was used.

As the silicone foam stabilizer, L-5309 (trade name), manufactured by Nippon Unicar Co., Ltd., was used.

As the water-soluble silicone foam stabilizer, SZ-1333 (trade name), manufactured by Nippon Unicar Co., Ltd., was used.

As the isocyanate, a mixture composed of 64% of 2,4-TDI, 16% of 2,6-TDI, and 20% of MDI was used.

No rust preventive was needed.

The backrests so produced had excellent flame retardancy. Moreover, in spite of the fact that a four-component head was used for the purpose of production, the piping could be prevented from rusting and the uniformed dispersion of auxiliary ingredients could be achieved.

Although the present invention has been described with reference to the embodiments shown in FIGs, it is not limited to these embodiments. All modifications, changes, and additions that are easily made by a person skilled in the art are embraced in the technical scope of the present invention.

The disclosure of Japanese Patent Application No.2001-141792 filed on May 11, 2001 including the specification, the claims, the drawings, and the abstract is incorporated herein by reference with its entirety.

What is claimed is:

1. A process for the production of a lightweight cold urethane, which comprises the steps of:

combining raw materials comprising 100 parts by weight of a polyol, an isocyanate used in an amount in the range of 70 to 140% of its stoichiometric amount for the polyol, and an auxiliary ingredient mixture comprising 2.5 to 5.5 parts by weight of water, 0.1 to 2.0 parts by weight of diethanolamine, 0.5 to 3 parts by weight of a catalyst, 0.4 to 2.0 parts by weight of a water-soluble silicone foam stabilizer, and 0 to 2.0 parts by weight of a silicone foam stabilizer; and injecting the raw materials into a mold in one shot.

2. The process for the production of a lightweight cold urethane as claimed in claim 1, wherein the polyol, the isocyanate, and the auxiliary ingredient mixture are each injected from separate storage vessels in the injecting step.

3. The process for the production of a lightweight cold urethane as claimed in claim 2, wherein said auxiliary ingredient mixture further comprises a rust preventive.

4. The process for the production of a lightweight cold urethane as claimed in claim 2, wherein said auxiliary ingredient mixture further comprises a polyol.

5. The process for the production of a lightweight cold urethane as claimed in claim 4, wherein the polyol of the auxiliary ingredient mixture is present in an amount of 0 to 50 parts by weight.

* * * * *